United States Patent
McCarty

(10) Patent No.: US 7,853,652 B2
(45) Date of Patent: * Dec. 14, 2010

(54) INSTANT MESSAGING SYSTEM WITH PRIVACY CODES

(75) Inventor: Richard James McCarty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2680 days.

This patent is subject to a terminal disclaimer.

(21) Appl. No.: 10/347,095

(22) Filed: Jan. 18, 2003

(65) Prior Publication Data

US 2004/0143633 A1    Jul. 22, 2004

(51) Int. Cl.
*G06F 15/16* (2006.01)
*G06F 17/30* (2006.01)

(52) U.S. Cl. .................. 709/206; 709/227; 709/230; 726/2; 726/26

(58) Field of Classification Search ............... 709/206, 709/227, 230; 726/2, 26, 326
See application file for complete search history.

(56) References Cited

U.S. PATENT DOCUMENTS

| | | | | |
|---|---|---|---|---|
| 6,434,600 | B2* | 8/2002 | Waite et al. ............... | 709/206 |
| 6,807,565 | B1* | 10/2004 | Dodrill et al. ............. | 709/206 |
| 6,973,571 | B2* | 12/2005 | Lee et al. ................... | 713/168 |
| 2003/0018725 | A1* | 1/2003 | Turner et al. .............. | 709/206 |
| 2003/0140103 | A1* | 7/2003 | Szeto et al. ................ | 709/206 |
| 2004/0015610 | A1* | 1/2004 | Treadwell .................. | 709/246 |
| 2004/0103153 | A1* | 5/2004 | Chang et al. .............. | 709/206 |

* cited by examiner

*Primary Examiner*—Ario Etienne
*Assistant Examiner*—Avi Gold
(74) *Attorney, Agent, or Firm*—Yee & Associates, P.C.; Jeffrey S. LaBaw

(57) ABSTRACT

Instant messages are processed in accordance with restrictions associated with privacy codes. A privacy code is obtained from a sender system prior to acceptance or delivery of any instant messages from the sender system. If a privacy code is received from the sender system, then a recipient system accepts or delivers instant messages from the sender system.

42 Claims, 9 Drawing Sheets

INSTANT MESSAGING SYSTEM WITH PRIVACY CODES

CROSS-REFERENCE TO RELATED APPLICATIONS

The present application is related to the following application with a common assignee:

U.S. patent application Ser. No. 10/347,087, filed on Jan. 18, 2003, titled "Method and system for publication of instant messaging privacy codes.

BACKGROUND OF THE INVENTION

1. Field of the Invention

The present invention relates to an improved data processing system and, in particular, to a method and system for multi-computer data transferring. Still more particularly, the present invention provides a method and system for multi-user communication using instant messaging.

2. Description of Related Art

The receipt of unwanted communications is a common problem that is widely experienced by many people. These communications may originate from organizations or persons with which a user no longer wants to communicate, or these messages may be unsolicited commercial messages.

The recognition of the problem of unwanted communications first arose with respect to telemarketing in which telemarketers would use a person's telephone number as a communication identifier to send unwanted telephone solicitation offers. Email has became a significant communication medium, and due to the ease of generating thousands of copies of electronic messages, unwanted email communication has become a significant problem. In fact, the term "spam" has been coined for the multitudinous, unwanted, indiscriminate nature of broadcast commercial email messages.

Instant messaging is a relatively new communication medium that is gaining popularity among people and corporations. While instant messaging has a certain immediacy that provides timesaving advantages in communication, instant messaging has the same disadvantage as email concerning the ease of reproduction of electronic messages. Hence, spam has also become a problem within instant messaging systems.

One of the factors that causes this problem is the fact that after someone's communication identifier has been divulged, it can be used to send communications for as long as the communication identifier is valid, which is typically several years. People often keep telephone numbers and email addresses for several years due to the inconvenience, inability, or cost of changing these communication identifiers in a frequent manner to avoid unwanted communications. Thus, it is difficult to outmaneuver or outrun unwanted communications by hiding behind communication identifiers that are unknown to the originators of unwanted communications.

Due to the harassing nature of unwanted telephone solicitations and email spam, laws have been enacted to address aggressive telemarketers and email spammers. Laws concerning email spam are being broadened to cover other electronic communication mediums like instant messaging. However, due to the widespread and international nature of global communication, local or national laws have little effect in stopping entities that send unwanted communications across jurisdictional borders without regard to legal restrictions.

Telephone telemarketing is somewhat inherently limited based on the fact that long-distance telecommunication can have significant costs. Caller-ID and call-blocking mechanisms have allowed call recipients to control unwanted calls. In addition, due to the circuit-switching-based nature of telecommunication, it is almost impossible for an harassing telemarketer to remain anonymous.

However, the cost for sending electronic communication messages is often so low as to be almost negligible compared to other costs of operating a commercial enterprise. Moreover, due to the packet-switching-nature of the Internet, an originator of electronic messages can forward messages through so-called anonymizing servers or use similar tricks in an attempt to remain anonymous. Since email spam and instant messaging spam can be generated with insignificant costs and through almost anonymous and extrajurisdictional means, spam can be assumed to be a long-term problem.

One solution to the email spamming problem has been the implementation of blocking lists based on email address, which block the delivery of all email messages from a certain email address. Another solution has been to filter email messages by scanning them for undesirable content. Although effective, some previous solutions allow delivery of unwanted email messages to a user who then has the burden of filtering or blocking the messages, while other previous solutions require a substantial transfer of control or privacy from the user to a service provider that performs filtering or blocking actions on behalf of the user.

These solutions for email spam are useful, but they also rely on the delayed nature of email message delivery. Email messages are sent to an inbox and then delivered to a user at some subsequent point in time, and the filtering operations can be performed on incoming email messages even though the filtering operations may delay the processing of the email messages to a small degree.

Similar filtering operations can be performed on messages that are transmitted through an instant messaging system. For example, an instant message recipient can block the receipt of messages from certain senders or can allow the receipt of messages only from certain senders. In addition, many instant messaging systems provide a means for a user to indicate an away-from-my-desk status or a do-not-disturb status or to control which other users are notified or can discover that the user is currently online.

Instant messaging, though, has an immediate, interactive characteristic that has not been employed by previous privacy solutions. Therefore, it would be advantageous to have a method and system for providing a user with the ability to selectively control the delivery of messages in an instant messaging system that employs the interactive nature of instant messaging. It would be particularly advantageous to maximize the flexibility of user control or administrative control.

SUMMARY OF THE INVENTION

A method, a system, an apparatus, and a computer program product are presented for processing instant messages in accordance with restrictions associated with privacy codes. In a first embodiment, after receiving an instant message at a recipient system from a sender system but prior to delivery of that instant message within the recipient system, the recipient system sends another instant message to the sender system that requests a privacy code, thereby returning a privacy code challenge to the sender system. The next instant message from the sender system is scanned, and if it contains a valid privacy code, then the recipient system accepts the previous instant message from the sender system, which is then processed in accordance with privacy parameters that are associated with the provided privacy code. The privacy parameters may indicate a method of delivering the previous instant message, such as whether it should be immediately delivered as an instant message or whether it should be delivered as an email message. The privacy codes and associated parameters may be managed through policies. The privacy functionality may be switched on or off in accordance with the privacy parameters. The privacy code challenge may be sent only if a valid privacy code has not been received from the sender system within the current instant messaging session.

In a second embodiment, a privacy code is requested from a sender system that has requested the establishment of an instant messaging connection or session with a recipient system. If a valid privacy code is obtained, then the instant messaging connection or session is established, and instant messages are subsequently accepted and processed from the sender system at the recipient system.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
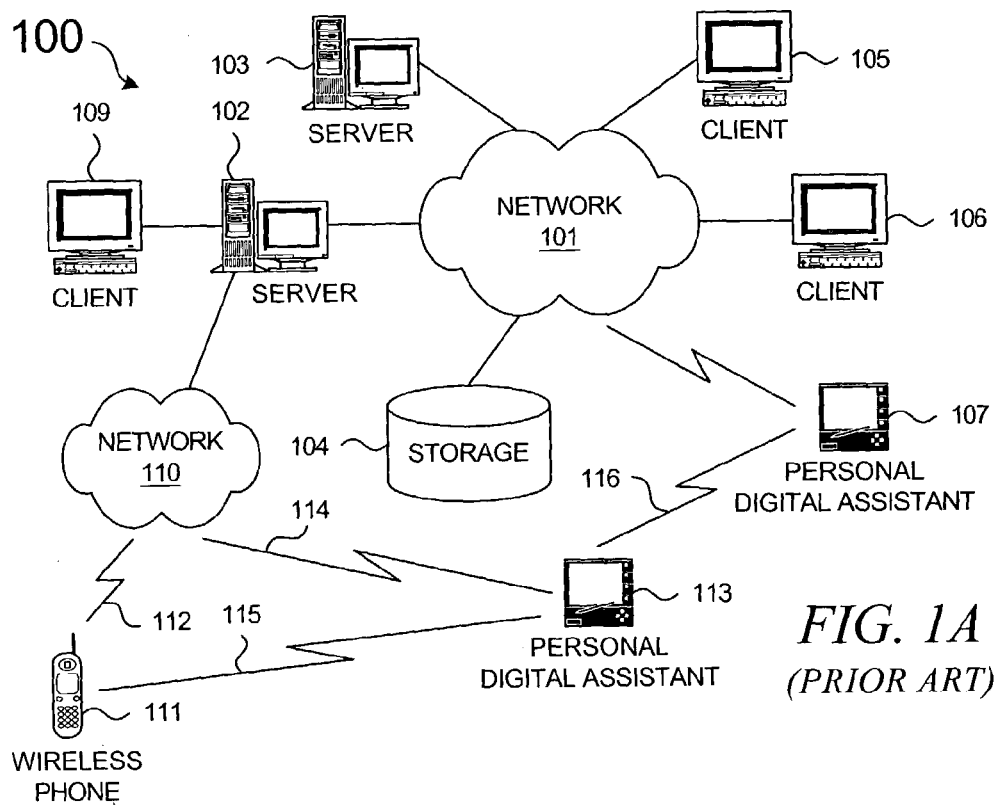
FIG. 1A depicts a typical distributed data processing system in which the present invention may be implemented.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), File Transfer Protocol (FTP), Hypertext Transport Protocol (HTTP), Wireless Application Protocol (WAP), Common Presence and Instant Messaging (CPIM) protocols, etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
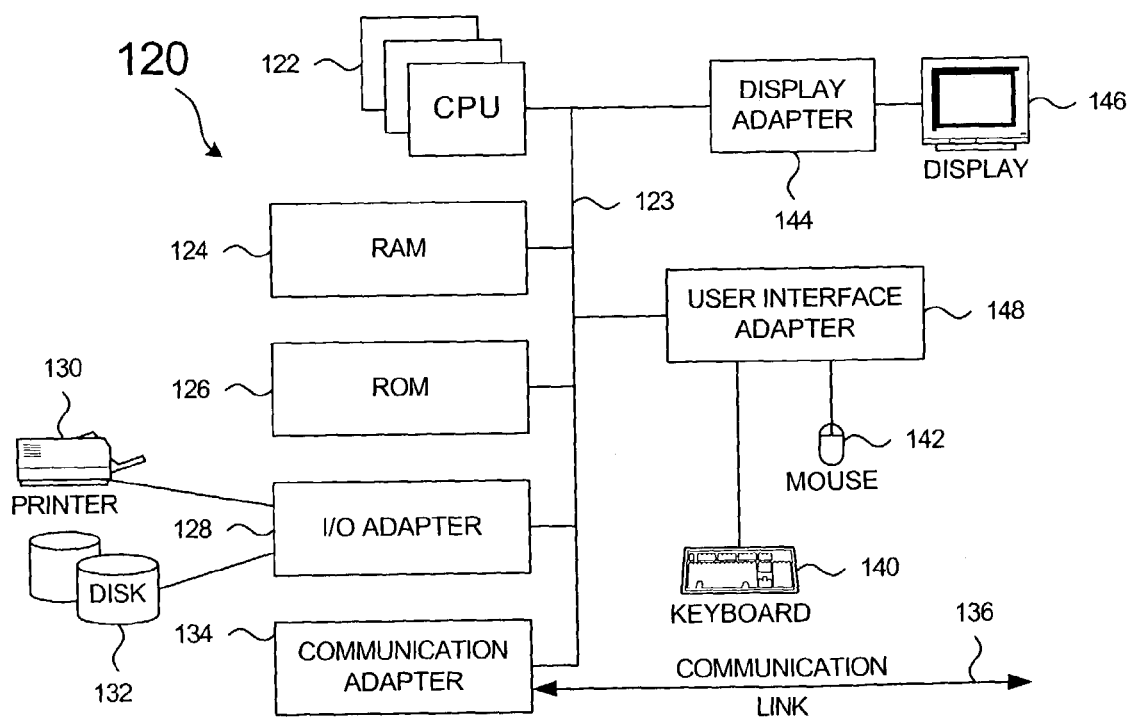
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to operating an instant messaging system, as described in more detail below with respect to the remaining figures. It should be noted that the exemplary scenarios that are described hereinbelow often refer to users and systems; it should be understood that a user interacts with a system such that the system performs actions on behalf of a user, and the terms "user" and "system" can sometimes be interchanged in a well-known manner to facilitate the description of operations at a data processing system.

Figure 2:
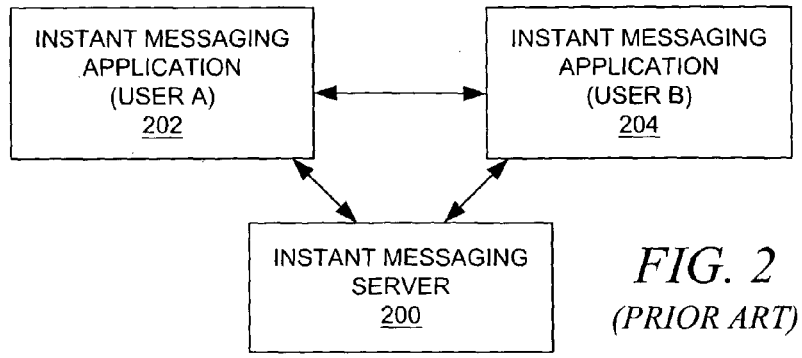
FIG. 2 depicts a block diagram that shows a typical instant messaging system.

With reference now to FIG. 2, a block diagram depicts a typical instant messaging system. Typical instant messaging systems have characteristics of a client/server organization and a peer-to-peer organization. Instant messaging (IM) server 200 authenticates a user of an instant messaging application, such as instant message application instances 202 and 204. After authenticating a user, the instant messaging server will perform certain operations on behalf of the instant messaging application. In this manner, an instance of an instant messaging application operates as an instant messaging client. The instant messaging server maintains some type of session for each active instant messaging client, which eventually logs out from the session or allows the session to undergo a timeout termination.

However, after being initialized with certain information, active instant messaging clients can communicate directly with each other by transferring instant messages directly to another active instant messaging client without assistance from the instant messaging server. In this manner, the separate instances of the instant messaging application act as peer nodes in a peer-to-peer network.

For example, assuming that a user has previously registered for an account with the instant messaging server, a user logs into the instant messaging server through an instant messaging application on a client device. The instant messaging server stores the connection information for the client device, such as the IP address of the client device and the port number that is assigned to the instant messaging application at the client device.

The instant messaging server also receives and stores an IM contact list for the user along with the user's connection information and other session information. The server performs an initial check to see if the users in the IM contact list are online and notifies the user's active instant messaging client of the online status of those users, e.g., whether those users are online and available for communication through the instant messaging system. The server monitors these IM contact lists such that when a user logs into the instant messaging system, the server notifies anyone who has the recently logged-in user within a IM contact list that the recently logged-in user is now online. In this manner, instant messaging users are constantly aware of the online status of the users within their IM contact lists.

When the instant messaging server notifies a first instant messaging client that a second instant messaging client is online, the instant messaging server sends the connection information for the second instant messaging client to the first instant messaging client and perhaps vice versa depending upon the online status of the user. Because each active instant messaging client has connection information for other active instant messaging clients in the instant messaging system, these instant messaging clients can transfer instant messages between themselves without interaction with the instant messaging server, i.e. in a peer-to-peer manner.

Text strings and file attachments for the instant messages are presented to a user of an active instant messaging client in a graphical user interface (GUI) window. A history of the instant messages within an instant messaging conversation is typically shown within a scrolling window; it is expected that both the sender and the recipient view the same content within their respective GUI windows during an instant messaging conversation. The instant messaging application may separately maintain different conversations into different windows during a user's instant messaging session, which may run for an extended period of time, e.g., during business hours within a corporate context.

Some instant messaging systems provide an away or unavailable status in which other users are notified that a user is logged into the instant messaging system while also indicating that the user cannot or will not immediately respond to instant messages. In a similar manner, some instant messaging systems provide a do-not-disturb or invisible status in which other users are not notified that a user is online. Each of these types of status has particular purposes for allowing a user to use an instant messaging application with certain restrictions that maintain some level of privacy.

The user-selectable options that have been provided by prior art instant messaging systems to control unwanted instant messages, including spam, are inadequate. In most scenarios, a user has a desire to remain online and available to some other instant messaging users, including users that may not be identified within an IM contact list.

The present invention is directed to an instant messaging system that employs privacy codes. The ability of a sender to provide a valid privacy code for a recipient indicates that the sender possibly has some legitimate need to contact the recipient or that the sender has possibly learned of a valid privacy code through some other user that does have a legitimate need to send instant messages to the recipient. The present invention is described in more detail further below with respect to the remaining figures.

Figure 3:
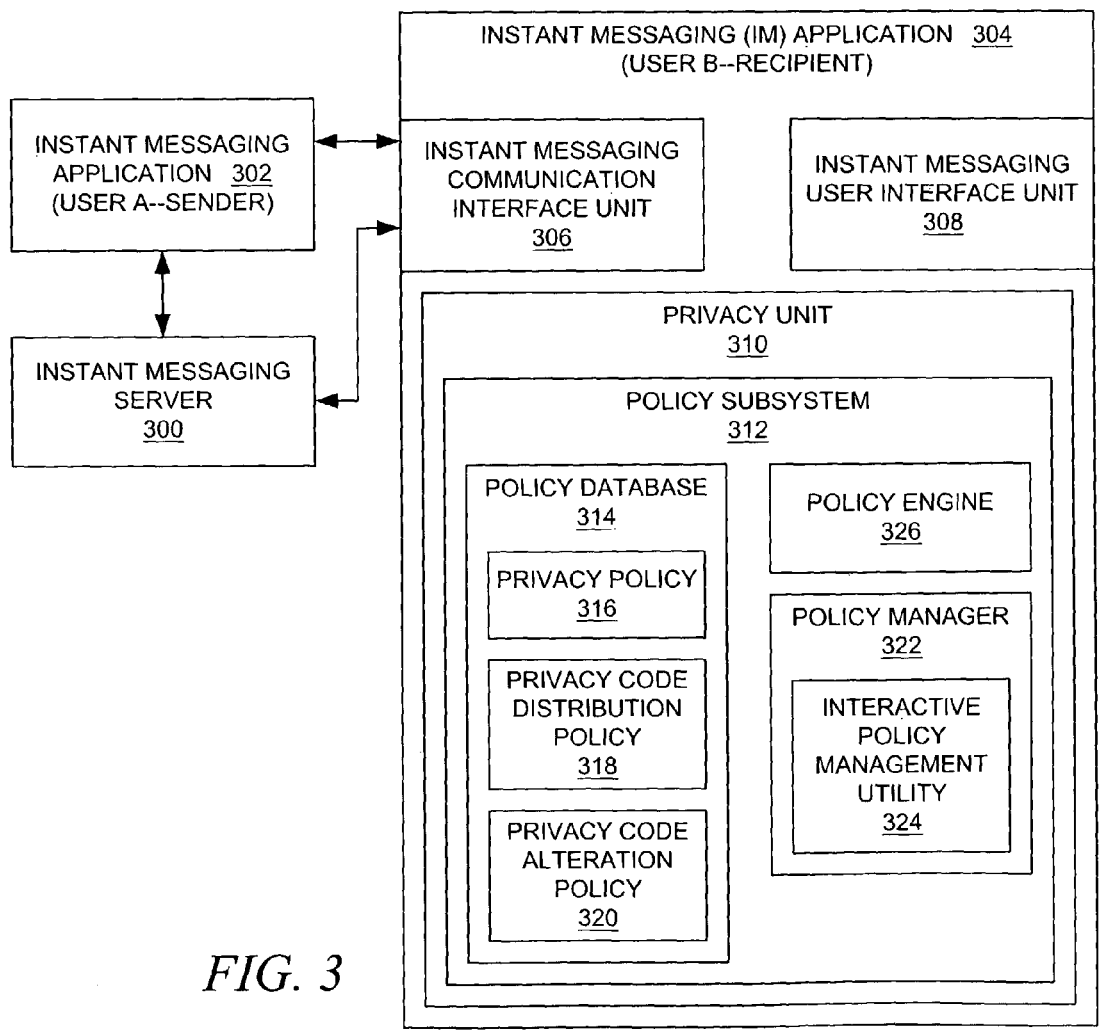
FIG. 3 depicts a block diagram that shows an example of an instant messaging system that has been extended to include the privacy functionality of the present invention.

With reference to FIG. 3, a block diagram depicts an example of an instant messaging system that has been extended to include the privacy functionality of the present invention. In a manner similar to the system that is shown in FIG. 2, the system that is shown in FIG. 3 illustrates instant messaging server 300 with two instances of an instant messaging application 302 and 304, which may also be termed as active instant messaging clients if they have already established an active session with instant messaging server 300. In a typical fashion, active instant messaging client 304 comprises components for interacting with other instant messaging clients, e.g., instant messaging communication interface unit 306, and components for interacting with users, e.g., instant messaging user interface unit 308, along with other components; it may be assumed that active instant messaging client 302 comprises similar components that are not shown in FIG. 3.

Active instant messaging clients 302 and 304 may communicate directly in a peer-to-peer fashion after obtaining connection information for each other from instant messaging server 300. Many instant messaging systems employ proprietary protocols, although standard instant messaging protocols have been proposed, e.g., Crocker et al., "Common Presence and Instant Messaging (CPIM)", Internet Draft of the Internet Engineering Task Force (IETF), draft-ietf-impp-cpim-03.txt, Aug. 2002. The exemplary embodiments of the present invention that are described hereinbelow are intended to operate with proprietary or non-proprietary protocols regardless of the instant messaging system or framework.

In contrast to FIG. 2, FIG. 3 shows that an instant messaging application has been enhanced to include privacy unit 310 that implements the privacy functionality of the present invention. In a preferred embodiment, privacy unit 310 performs operations on privacy codes for this privacy functionality through policy subsystem 312, which may be an integrated proprietary policy management system; depending upon the implementation of the present invention, though, the privacy unit may interact with a commercially available policy management system, possibly through an application programming interface (API) or other external mechanism. However, the privacy functionality of the present invention may be performed using embedded logic within the instant messaging application without reliance on a formally defined policy subsystem.

Policy subsystem 312 comprises policy database 314 for storing policies, such as one or more privacy policies 316, one or more privacy distribution policies 318, and one or more privacy alteration policies 320. A privacy policy contains rules and parameters, including currently valid privacy codes for a given user, for establishing and using privacy codes in conjunction with the acceptance and the delivery of instant messages from other instant messaging clients. A privacy code distribution policy contains rules and parameters for determining the manner in which privacy codes are distributed to other users or other instant messaging clients. A privacy code alteration policy contains rules and parameters for determining the manner in which a set of privacy codes may or may not be altered.

Depending upon the implementation of the present invention, these policies could be integrated into a single privacy policy, although their separation may provide for a variety of management operations with respect to the characteristics of the different policies. Multiple policies or multiple sets of policies may be managed at a single client device if the client device is used by multiple unique users or if the client device is used by a single user with reference to multiple user identities. Policy manager 322 manages the policies in policy database 314; interactive policy management utility 324 allows a user or an administrator to create, generate, review, edit, modify, delete, or otherwise manage policies.

Policy engine 326 dynamically determines whether rules or conditions within a policy have been satisfied based on information that is provided by other programmatic entities; policy engine 326 acts as a decision-maker to which other programmatic entities defer. In this example, privacy unit 310 provides certain information to policy subsystem 312, which then relies upon policy engine 326 to make certain decisions based on the provided information and any previously configured privacy policies.

Figure 4:
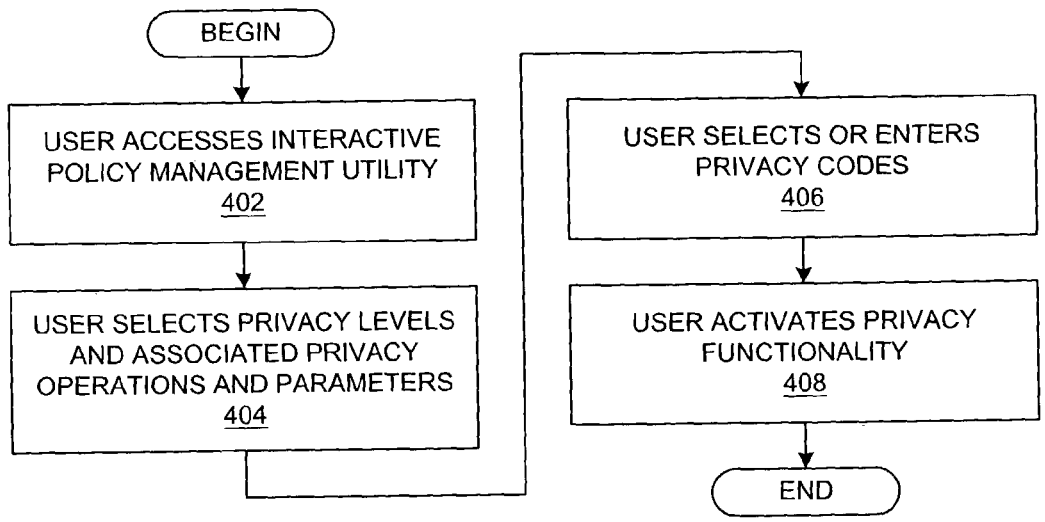
FIG. 4 depicts a flowchart that shows a process in which a user configures privacy-related policies and parameters for use in implementing the privacy functionality of the present invention.

With reference to FIG. 4, a flowchart depicts a process in which a user configures privacy-related policies and parameters for use in implementing the privacy functionality of the present invention. Although a user or an administrator may create, modify, or delete privacy-related policies and parameters at any time, the process in FIG. 4 may represent an initial configuration phrase or stage that is performed prior to using a newly installed instant message application and then is performed relatively infrequently. It should also be noted that the user may rely upon default values that are pre-configured for an instant message application such that the user or the administrator does not necessarily have to perform the process that is shown in FIG. 4.

The process begins with the user accessing an interactive policy management utility (step 402), which can be assumed to be integrated in some manner with the instant messaging application. The user selects various privacy-related parameters, such as privacy levels and associated privacy operations, that are to be used by the instant messaging application (step 404). Privacy codes may be generated automatically, or the user may initiate the generation of privacy codes, select privacy codes, or enter privacy codes (step 406). The user also chooses whether or not privacy policies should be activated, thereby switching on or off the privacy functionality of the present invention (step 408), and the process is concluded. If the present invention is not using a policy subsystem and its associated interactive policy management utility, then the user would interact with the instant messaging application or a related application to set privacy-related parameters in a similar manner.

Figure 5B:
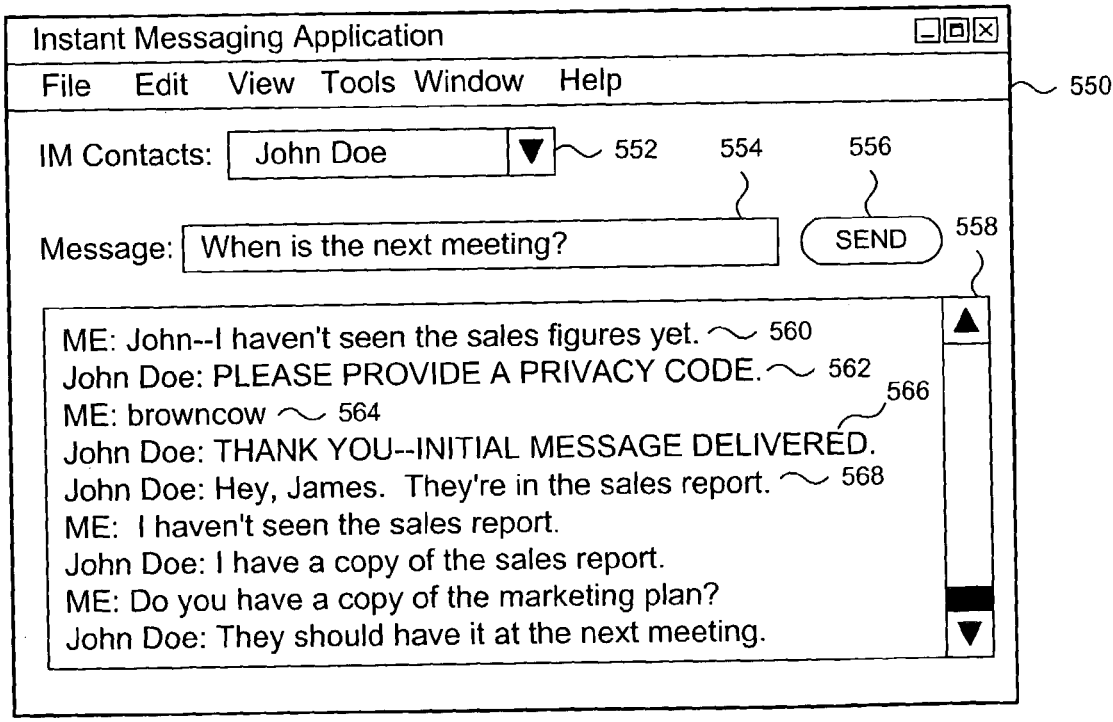
FIG. 5B depicts a diagram that shows a graphical user interface window for an instant messaging application that shows the use of a privacy code.
Figure 5A:
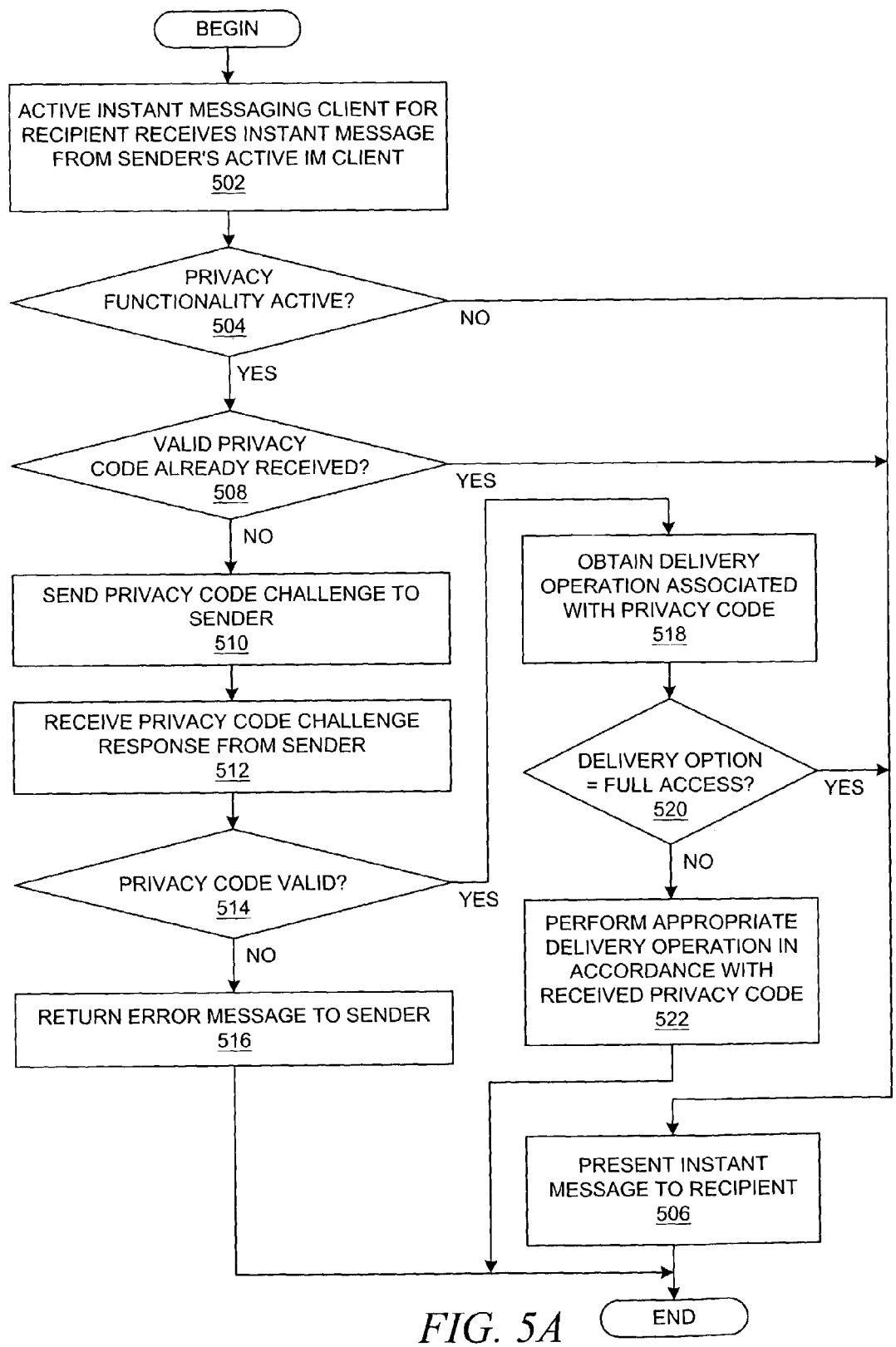
FIG. 5A depicts a flowchart that shows a process for using privacy codes in an instant messaging system to determine whether or not to accept an instant message and to determine the manner in which an accepted instant message should be delivered in accordance with an embodiment of the present invention.

With reference to FIG. 5A, a flowchart depicts a process for using privacy codes in an instant messaging system to determine whether or not to accept an instant message and to determine the manner in which an accepted instant message should be delivered in accordance with an embodiment of the present invention. The process that is shown in FIG. 5A is performed after privacy-related processing parameters and/or policies, including privacy codes, have been configured for an instant message client application, e.g., as shown in FIG. 4. In addition, the process that is shown in FIG. 5A would be performed for each instant message that is received after the recipient user has logged into the instant messaging system.

The process begins with the recipient's active instant messaging client receiving an instant message from a sender's active instant messaging client (step 502). A determination is made as to whether or not privacy functionality is active (step 504), e.g., with reference to a privacy-related parameter that indicates a switched on/off status for the privacy functionality at the recipient's active instant messaging client. If the privacy functionality is not active, then the instant message is immediately presented to the recipient (step 506), and the process is concluded.

If the privacy functionality is active, then a determination is made as to whether or not a valid privacy code has already been received from the sender (step 508). In other words, the recipient's instant messaging client can cache an indicator when a valid privacy code is received from a sender's instant messaging client during a current instant messaging session or conversation; the connection information, e.g., IP address, for the sender's instant messaging client could be stored in association with the cached indicator. When an instant message is received, the connection information from the received instant message can be compared against the information in the cache to see if a valid privacy code has already been received from the sender's instant messaging client. If so, then it is not necessary for the sender's instant messaging client to provide the valid privacy code again, and the received instant message is immediately presented to the recipient at step 506, and the process is concluded.

If the recipient's instant messaging client has not previously received a valid privacy code, then the recipient's instant messaging client sends a privacy code challenge to the sender's instant messaging client (step 510). At some later point in time, a privacy code challenge response is received from the sender's instant messaging client (step 512). Although the flowchart depicts the process as occurring synchronously, the process may be asynchronous such that the recipient's instant messaging client can perform other tasks while waiting for the response from the sender's instant messaging client. In addition, the recipient's instant messaging client could limit the response time with a timer, and if the timer expires, then the conversation or instant messaging session would be terminated by the recipient's instant messaging client.

The recipient's instant messaging client then determines if the received privacy code is valid (step 514). If not, then an error message might be returned to the sender's instant messaging client to inform the sender that the initial instant message would not be delivered, and the process is concluded. The error message may invite the sender to contact the recipient through some other communication medium, e.g., via email by providing the sender with an email address.

If the received privacy code is valid, then the delivery operation that is associated with the privacy code within the privacy-related parameters is retrieved (step 518). In this example, each privacy code has an associated delivery operation; depending on the implementation of the present invention, different types of delivery operations and delivery options may be associated with different privacy codes, as explained in more detail further below. A determination is then made as to whether or not the associated delivery option indicates "full access" (step 520), in which case the initial instant message is immediately presented to the recipient at step 506, and the process is concluded. If some other type of delivery operation is indicated, then the appropriate delivery operation is performed in accordance with the associated privacy code (step 522), and the process is complete.

With reference now to FIG. 5B, a diagram depicts a graphical user interface window for an instant messaging application that shows the use of a privacy code that is obtained through an instant message. Window 550 is presented on a display device connected to a data processing system on which an instance of an instant messaging application is executing for a sending user, i.e. a sender. In a typical fashion for an instant messaging application, window 550 contains several user interface controls for operating the instant messaging application. Drop-down menu 552 contains the user's contact list. Text entry field 554 allows entry of a text string to be sent as an instant message. "SEND" button 556 initiates a transmit operation to generate and send the contents of the text entry to the selected instant message contact. Scrollable text area 558 contains the history of the instant messaging conversation. Text line 560 is the initial instant message that was sent by the sender to the recipient.

In contrast to typical instant messaging applications, text line 562 is a privacy code request or challenge from the recipient's instant messaging client that has been displayed on the sender's instant messaging client. In this example, a privacy code is obtained using the process that is shown in FIG. 5A. The recipient's instant messaging client has not previously received a valid privacy code from the sender, so the recipient's instant messaging client is automatically challenging the sender for a privacy code using an instant message prior to delivering the initial instant message 560 to the recipient. The automatic nature of instant message 562 is reflected by the fact that the instant message was formatted as all capital letters.

In response, the sender has entered a privacy code that has been previously acquired or is somehow known by the sender; text line 564 reflects the instant message that the sender returned to the recipient's instant messaging client as the attempted privacy code. The recipient's instant messaging client has automatically returned instant message 566 that briefly indicates what has occurred; in this example, instant message 566 merely indicates that the initial instant message was delivered, which implies that the received privacy code was valid such that instant messages 560 was accepted, processed, and immediately delivered to the recipient. Instant message 568 is the first instant message that has actually been entered by the recipient. The remaining text lines in text area 558 reflect instant messages for the continuing conversation.

Figure 6:
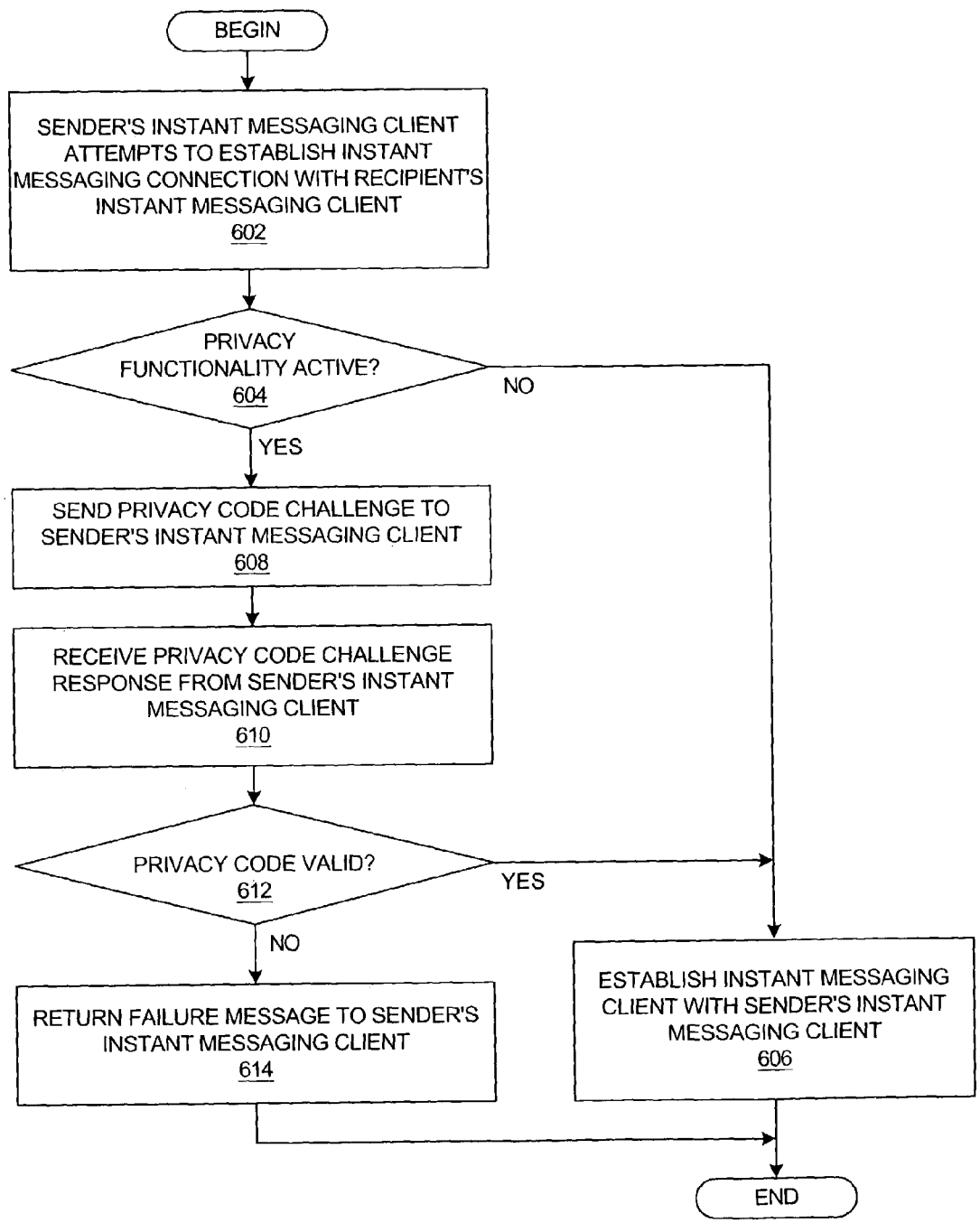
FIG. 6 depicts a flowchart that shows a process for obtaining privacy codes during the establishment of an instant messaging connection or session.

With reference now to FIG. 6, a flowchart depicts a process for obtaining privacy codes during the establishment of an instant messaging connection or session. The protocol for the privacy code challenge between a recipient's instant messaging-client and a sender's instant messaging client may vary without affecting the scope of the present invention. In the example that is shown in FIG. 5B, the privacy code challenge has occurred through the normal communication channel in the instant messaging system, i.e. via instant messages. In a different embodiment of the present invention, special messages or a special data format for the privacy code could be exchanged between the instant messaging clients.

The process that is shown in FIG. 6 begins when the sender's instant messaging client attempts to establish an instant messaging session or connection with the recipient's instant messaging client (step 602). The underlying instant messaging protocol would have a procedure for establishing a connection before the transfer of instant messages could occur. In contrast to the process for obtaining a privacy code that is shown in FIG. 5A, in the example shown in FIG. 6, the privacy code is requested and received during the establishment of the connection or session in accordance with the underlying instant messaging protocol. When an instant messaging session or connection is requested from a sender's instant messaging client, one or more specially formatted messages would be exchanged. After the initial exchange of information, the present invention inserts an additional requirement of obtaining a privacy code if necessary. Depending on the instant messaging protocol, the entity that requests the privacy code could be the instant messaging server or the recipient's instant messaging client.

A determination is made as to whether or not privacy functionality is active (step 604), e.g., with reference to a privacy-related parameter that indicates a switched on/off status for the privacy functionality at the recipient's active instant messaging client. If the privacy functionality is not active, then the instant messaging connection is established (step 606), and the process is concluded.

If the privacy functionality is active, then a privacy code challenge is sent to the sender's instant messaging client (step 608). At some later point in time, a privacy code challenge response is received from the sender's instant messaging client (step 610). Although the flowchart depicts the process as occurring synchronously, the process may be asynchronous such that the requesting entity can perform other tasks while waiting for the response from the sender's instant messaging client. In addition, the response time could be limited with a timer, and if the timer expires, then the session or connection would be not be established.

A determination is made as to whether or not the privacy code is valid (step 612). If the received privacy code is valid, then the instant messaging connection is established at step 606, and the process is concluded. If the privacy code is not valid, then a failure message might be returned to the sender's instant messaging client to inform the sender that the session or connection will not be established (step 614), and the process is concluded. The error message may invite the sender to contact the recipient through some other communication medium, e.g., via email by providing the sender with an email address.

Figure 7:
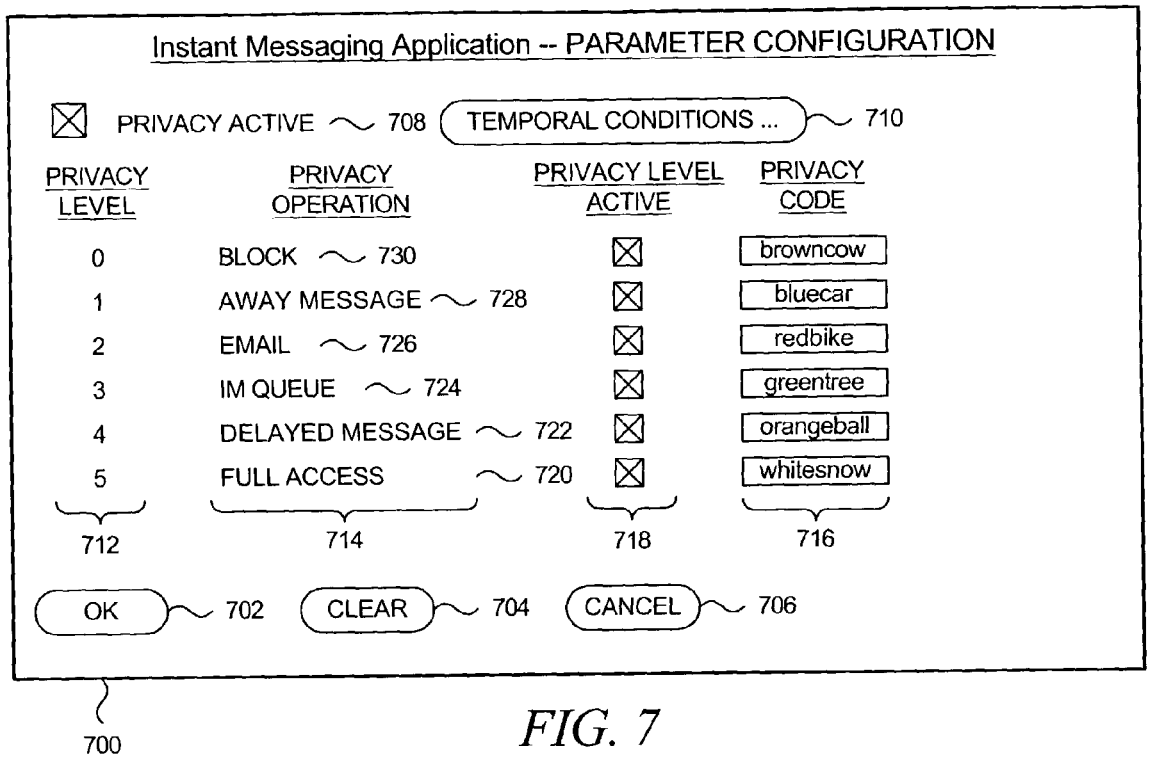
FIG. 7 depicts a diagram that shows a graphical user interface window for an instant messaging application through which a user enters privacy-related parameters.

With reference now to FIG. 7, a diagram depicts a graphical user interface window for an instant messaging application through which a user enters privacy-related parameters. Window 700 is a type of dialog box in which a user may use various GUI controls to enter or choose privacy-related parameters. "OK" button 702 closes window 700 and commits the parameter values. "CLEAR" button 704 resets the parameter values. "CANCEL" button 706 closes window 700 without committing any changes to the parameter values.

Checkbox 708 allows a user to switch on/off the privacy functionality of the present invention; if the privacy functionality is switched off, then an instant messaging application that includes the privacy functionality of the present invention may operate in a typical fashion like prior art instant messaging applications. If the user selects button 710, the user would be allowed to enter other parameters related to automatically timing the active/inactive functionality. For example, the user may want the privacy functionality to have an active status during business hours and an inactive status outside of business hours such that anyone has full access to the user automatically when it is not business hours.

Privacy levels 712 indicate that the instant messaging system supports multiple privacy levels. Each privacy level is associated with a privacy operation 714 and a privacy code 716. Each privacy level also has an associated checkbox 718 for activating/inactivating its associated privacy level. In a simple scenario, only the full access privacy level might be active; if a sender knows the privacy code for this privacy level, then an instant message is accepted, but otherwise no incoming instant messages are accepted.

In this example, each privacy operation 714 is set to a particular privacy operation. A privacy operation is a type of processing that will be applied to an incoming instant message that is accepted for that privacy level, i.e. when the sender provides the proper privacy code for that privacy level. However, the privacy operation that is associated with each privacy level could be customizable through a drop-down menu. In addition, each privacy level could have other selectable parameters for additional processing operations that occur when an instant message is received for that privacy level. For example, the user may desire to be alerted to the presence of instant messages at different privacy levels through different mechanisms, such as a flashing indicator on a display screen or an alert sound.

Privacy operation 720 indicates that an instant message will be immediately presented to the user. Privacy operation 722 indicates that an instant message will be delayed if necessary. For example, the user might engage in multiple simultaneous instant messaging conversations. When two instant messages arrive at the recipient's instant messaging client at approximately the same time, the instant message at the higher privacy level should be presented first for some period of time before the recipient is interrupted with an instant message at the lower privacy level.

Privacy operation 724 indicates that an instant message will be placed into an instant messaging queue for later retrieval or review by the recipient in a manner similar to placing email messages in an inbox. It could be assumed, though, that the instant messaging queue would be more readily available than an email inbox because of the nature of an instant messaging application. For example, a user typically opens an instant messaging application on a computer desktop for an extended period of time, and if the user is responding to instant messages at a higher privacy level, it could be assumed that the user might check the instant messaging queue relatively often.

Privacy operation 726 indicates that an instant message will be placed into an email inbox. Additional processing may be performed, such as mapping the identifier of the sender of the instant message to the sender's email address so that the recipient could easily respond to the received instant message in the form of an email message.

Privacy operation 728 indicates that an instant message will be automatically returned to the sender that informs the sender that the recipient is not available to respond immediately to a received instant message. Although this privacy operation is similar to placing a received instant message in an instant message queue, it should have a chilling effect on the instant messaging conversation that the sender is attempting to have with the recipient, whereas an instant messaging queue may merely slow the pace of an ongoing instant messaging conversation.

Privacy operation 730 indicates that an instant message will be blocked, i.e. essentially ignored. Blocking an instant messaging conversation has particularly advantages. For example, a recipient can maintain an online status and can be available to respond to instant messages at higher privacy levels while ignoring instant messages at the blocking privacy level. The user could provide this privacy code when the user receives a request for an instant messaging privacy code rather than denying a privacy code to someone who requests one. In this manner, the privacy code that is associated with a blocking operation provides a false indication that the recipient would respond to users who possess the privacy code at the blocking privacy level.

Each privacy code has an associated text entry box for entering the privacy code that is to be associated with a privacy level and privacy operation. Alternatively, the privacy codes might be generated automatically, or the user may have the ability to choose whether they are entered or automatically generated. As another alternative, the user may be provided with parameters that control when the privacy codes are automatically changed or refreshed.

The description of the previous figures assume that one or more privacy codes for a user are distributed in some manner among potential senders of instant messages, and it is assumed that the privacy codes are distributed orally or in some manner without providing any details on the manner in which they might be distributed. The description of the remaining figures relates to a framework in which a set of privacy codes may be distributed electronically.

Figure 8:
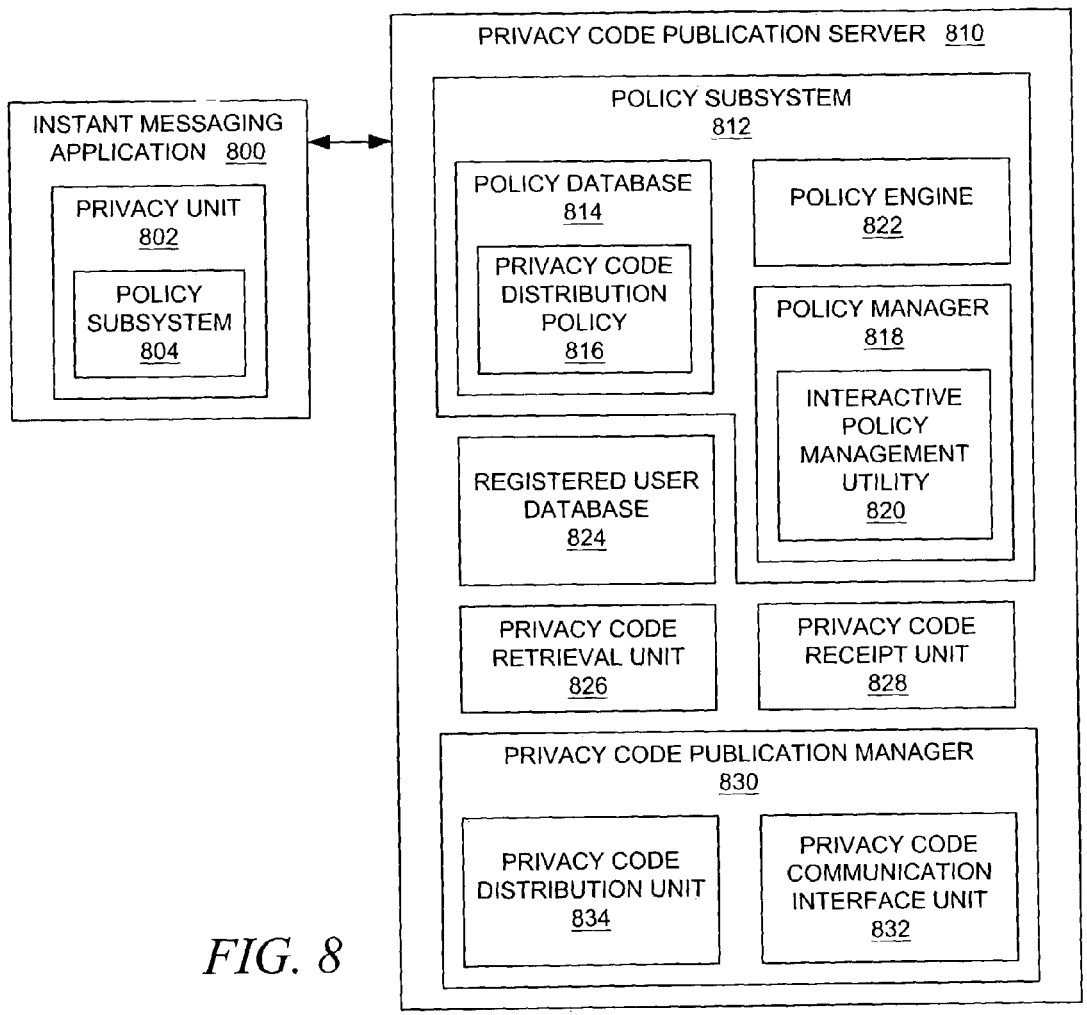
FIG. 8 depicts a block diagram that shows a publication server that may be used to publish privacy codes within an instant messaging system.

With reference now to FIG. 8, a block diagram depicts a publication server that may be used to publish privacy codes within an instant messaging system. In a manner similar to that shown in FIG. 3, instant messaging client application 800 contains privacy unit 802 and policy subsystem 804 along with other components that are not shown. Instant messaging client application 800 interacts with privacy code publication server 810, which comprises the functionality for publishing a set of privacy codes, preferably for more than one user when interacting with multiple instant messaging client applications.

In a manner similar to instant messaging client application 800, privacy code publication server 810 also comprises policy subsystem 812, which may be an integrated propriety policy management system; depending upon the implementation of the present invention, though, the publication server may interact with a commercially available policy management system, possibly through an API. However, the policy functionality may be performed using embedded logic within the publication server without reliance on a formally defined policy subsystem.

Policy subsystem 812 comprises policy database 814 for storing policies, such as one or more privacy distribution policies 816. As noted previously, a privacy code distribution policy contains rules and parameters for determining the manner in which privacy codes are distributed to other users or other instant messaging clients. Policy manager 818 manages the policies in policy database 814. Interactive policy management utility 320 allows a user or an administrator to create, generate, review, edit, modify, delete, or otherwise manage policies. Policy engine 822 dynamically determines whether rules or conditions within a policy have been satisfied based on information that is provided by other programmatic entities; policy engine 326 acts as a decision-maker to which other programmatic entities defer. In this example, publication server 810 provides certain information to policy subsystem 812, which then relies upon policy engine 822 to make certain decisions based on the provided information and any previously configured policies.

Assuming that privacy code publication server 810 is publishing privacy codes for many users within an instant messaging system, privacy code publication server 810 must obtain the privacy codes for those users. Registered user database 824 provides a list of those users for which the privacy code publication server 810 is responsible for publishing privacy codes. Alternatively, privacy code publication server 810 obtains a list of registered users from the instant messaging server that authenticates users of the instant messaging system or from some other source.

Privacy code publication server 810 may obtain privacy codes through two different modes of operation. In a first mode of operation, privacy code publication server 810 pulls privacy codes from instant messaging client applications using privacy code retrieval unit 826, which may interact with an instant messaging server to be notified when an instant messaging client application is logging into the system, at which time privacy code retrieval unit 826 requests or otherwise retrieves the privacy codes from the instant messaging client that is logging into the instant messaging server. In a second mode of operation, instant messaging client applications push privacy codes to privacy code receipt unit 828, possibly immediately after logging into the instant messaging server. In either method, privacy code publication server 810 obtains privacy codes in a timely manner, which may be important if the instant messaging client applications frequently change their privacy codes.

Privacy codes are gathered and published on an on-going basis. Privacy code publication manager 830 is responsible for publishing the privacy codes by transmitting the privacy codes to a set of locations through a variety of means via appropriate communication mediums, as described in more detail further below. Privacy code communication interface unit 832 contains the necessary functionality to interact with different types of communication systems. Privacy code distribution unit 834 contains the functionality for interacting with the policy subsystem to determine when and how one or more privacy codes should be published.

Figure 9:
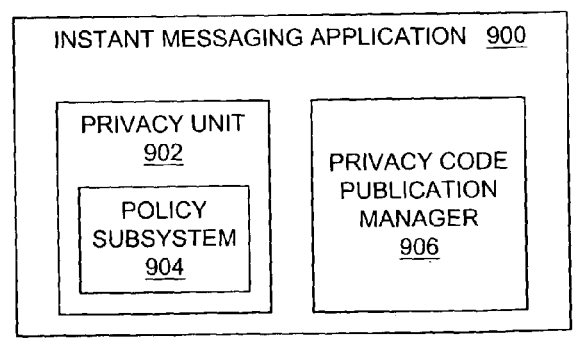
FIG. 9 depicts a block diagram that shows an instant messaging client application that has been enhanced to include functionality for publishing the privacy codes that are used by the instant messaging client application.

With reference now to FIG. 9, a block diagram depicts an instant messaging client application that has been enhanced to include functionality for publishing the privacy codes that are used by the instant messaging client application. In contrast to the instant message system shown in FIG. 8, the publication of privacy codes may be done individually by each instance of an instant messaging application; the instant messaging application publishes only its own privacy codes. In this example, instant messaging application 900 comprises privacy unit 902 with embedded policy subsystem 904 along with privacy code publication manager 906, which contains the functionality for interacting with the policy subsystem to determine when and how one or more privacy codes should be published.

Figure 10:
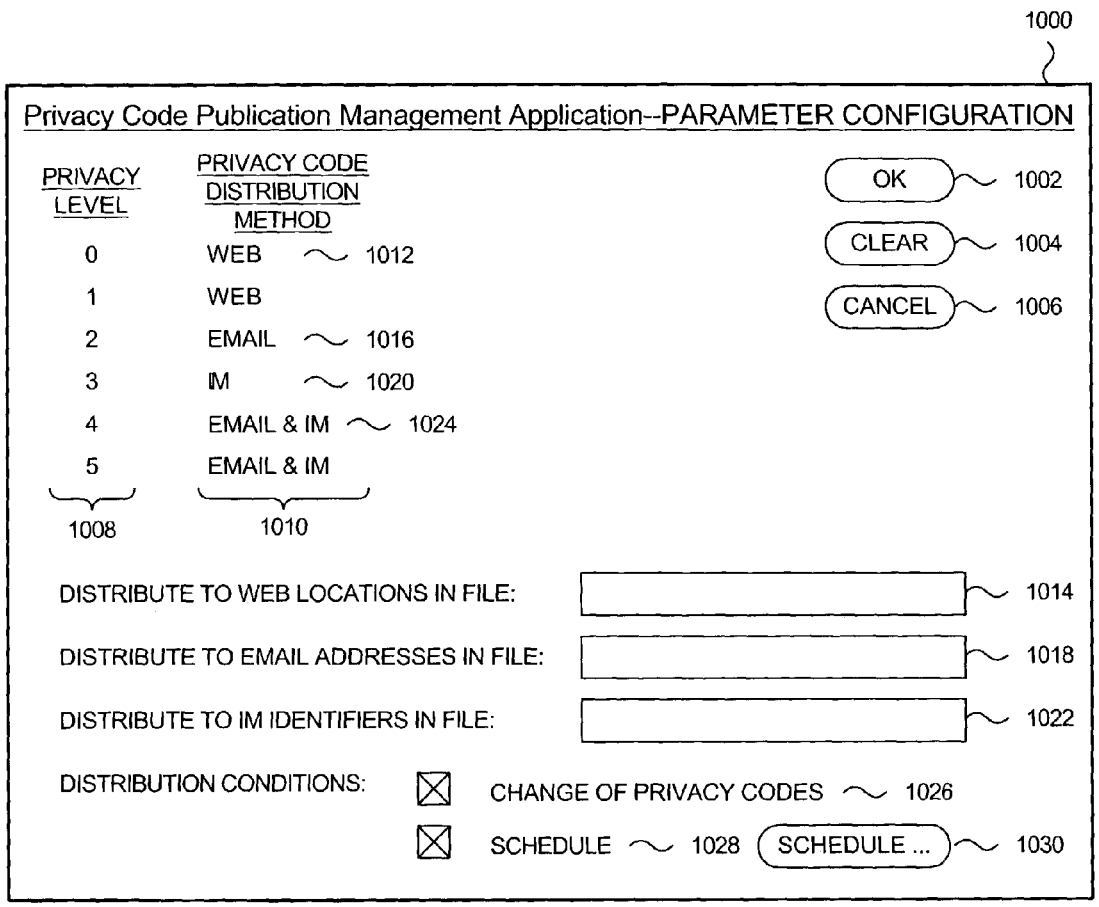
FIG. 10 depicts a diagram that shows a graphical user interface window for a management utility through which a user or an administrator enters parameters for use in controlling the distribution or publication of privacy codes to be used within an instant messaging system.

With reference now to FIG. 10, a diagram depicts a graphical user interface window for a management utility through which a user or an administrator enters parameters for use in controlling the distribution or publication of privacy codes to be used within an instant messaging system. Window 1000 is a type of dialog box in which a user may use various GUI controls to enter or choose parameters. "OK" button 1002 closes window 1000 and commits the parameter values. "CLEAR" button 1004 resets the parameter values. "CANCEL" button 1006 closes window 1000 without committing any changes to the parameter values.

Privacy levels 1008 indicate the instant messaging system supports multiple privacy levels, as explained above. Each privacy level is associated with a type of privacy code distribution method 1010, which indicates the manner in which privacy codes will be distributed for a particular privacy level. Privacy code distribution method 1010 may be hardcoded into the management application, or the user may be provided with a drop-down menu or some other control for selecting or entering the distribution method at each privacy level.

"WEB" distribution method 1012 indicates that a set of privacy codes are to be distributed to particular Web locations as stored in filename 1014. The Web locations may be specified through the use of Uniform Resource Identifiers (URIs). "EMAIL" distribution method 1016 indicates that a set of privacy codes are to be distributed to particular email addresses as specified within filename 1018. "IM" distribution method 1020 indicates that a set of privacy codes are to be distributed to particular users of the instant messaging system as specified by instant messaging system user identifiers that are stored within filename 1022. Distribution method 1024 indicates that the privacy codes should be distributed via both email and instant messages. Alternatively, all of the publication targets may be stored within a single file. The manner in which these distribution methods are employed is discussed in more detail further below with respect to FIG. 12.

The privacy codes can be distributed based on various conditions. Checkbox 1026 indicates that privacy codes should be distributed when a privacy code is modified. Checkbox 1028 indicates that privacy codes should be distributed in accordance with a schedule, and the scheduling parameters are entered within a window that is presented after selecting button 1030.

Figure 11:
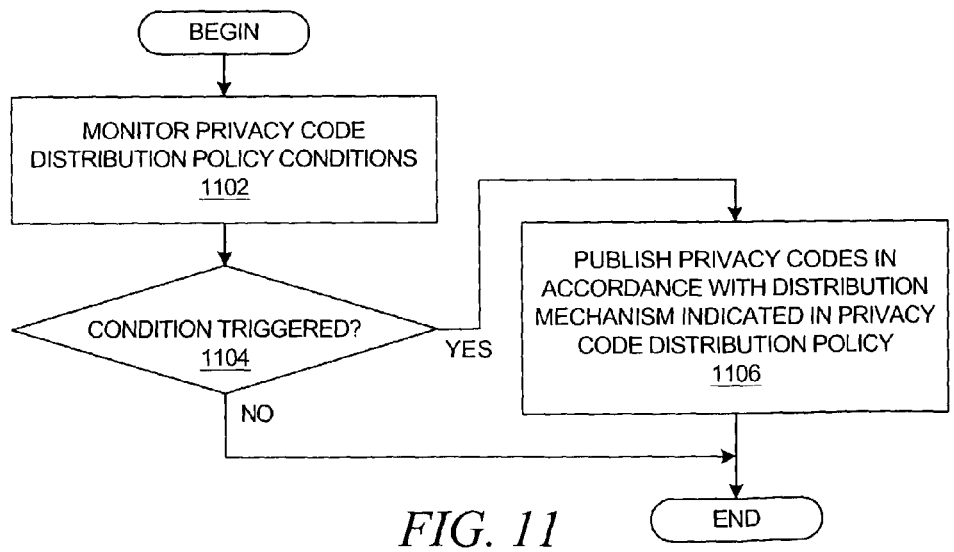
FIG. 11 depicts a flowchart that shows a manner in which privacy codes can be distributed in accordance with a distribution policy.

With reference now to FIG. 11, a flowchart depicts a manner in which privacy codes can be distributed in accordance with a distribution policy. While the privacy codes may be distributed within the instant messaging system of the present invention without the use of a policies, policies provide flexibility in conditioning the publication of the privacy codes. The parameters that are shown within window 1000 in FIG. 10 can be stored as part of a privacy code distribution policy. The publication server relies on a policy engine to indicate when a privacy code publication operation should be performed.

The process begins with the policy engine monitoring conditions that are indicated within a privacy code distribution policy (step 1102). The policy engine operates in a type of event loop in which it constantly evaluates a set of conditions to determine whether a condition is met (step 1104). At some point in time, a condition is satisfied or triggered, after which the publication server publishes the privacy codes that are associated with the privacy code distribution policy (step 1106). For example, either one user or multiple users have privacy codes for which a particular distribution policy controls their publication, and only the privacy codes for that user or that set of multiple users are subsequently distributed when the conditions in the policy are met.

Figure 12:
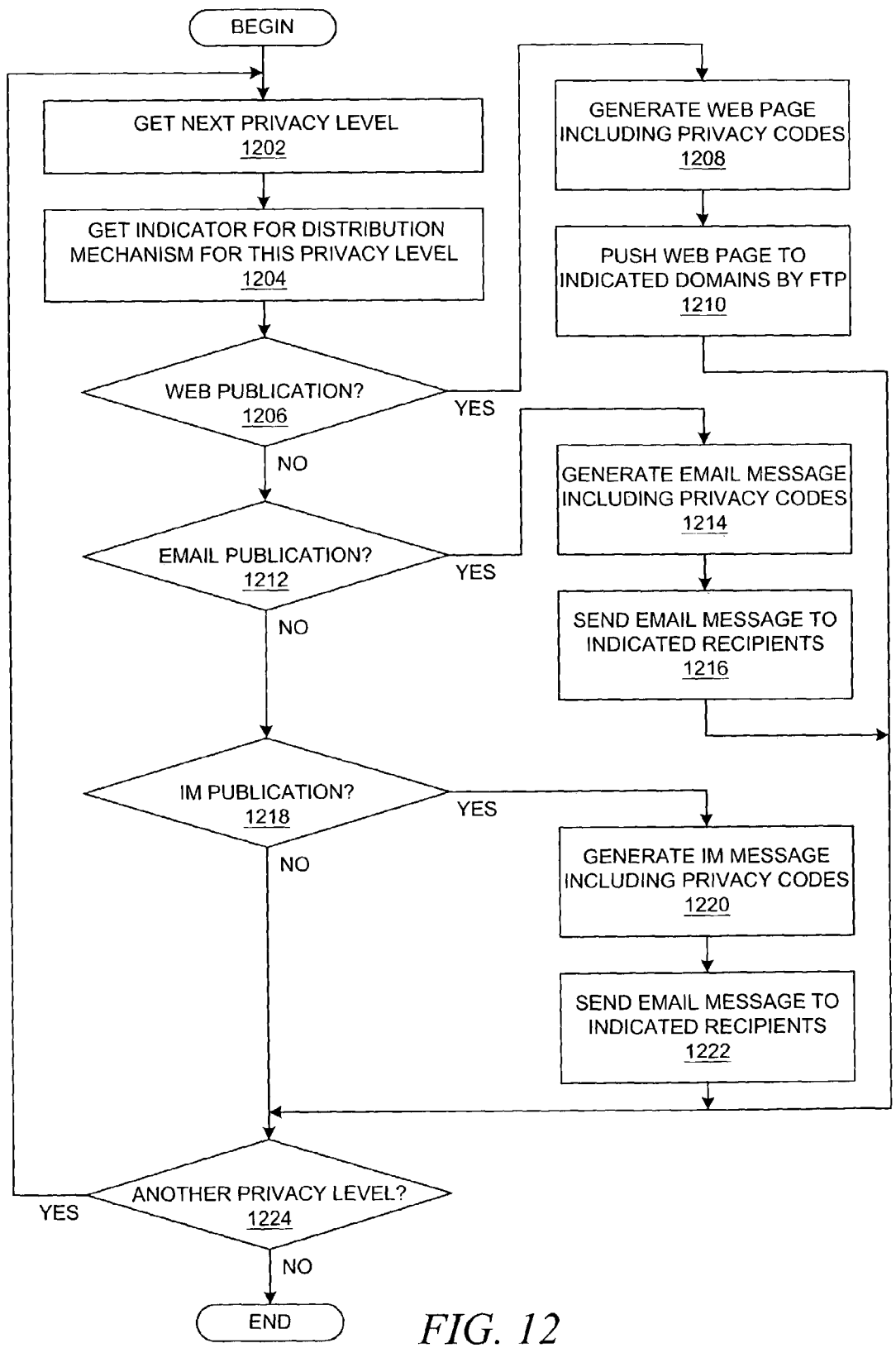
FIG. 12 depicts a flowchart that shows a process for publishing privacy codes through various communication mediums.

With reference now to FIG. 12, a flowchart depicts a process for publishing privacy codes through various communication mediums. In the example shown in FIG. 12, it is assumed that the process has been triggered by a publication condition that has been satisfied in accordance with a privacy code distribution policy. For example, a privacy code publication server may publish privacy codes based on a schedule, for example, on the first day of each month, thereby invoking the process that is shown in FIG. 12.

The process begins by obtaining the next unprocessed privacy level (step 1202). Assuming that the system supports multiple privacy levels with a particular publication method associated with each privacy level, then the process loops through the privacy levels. The parameter indicating the distribution mechanism associated with the current privacy level is then retrieved (step 1204). If the associated publication mechanism indicates Web publication (step 1208), then a Web page is generated that includes the privacy codes as text within the Web page (step 1208), and the Web page is transmitted to the appropriate Web sites or locations (step 1210), e.g., as indicated by other parameters or by URIs that are stored within a file.

If the associated publication mechanism indicates email publication (step 1212), then an email message is generated that includes the privacy codes as text within the email message along with other information (step 1214), e.g., an explanation of the origin and purpose of the message so that the recipient of the message understands why the message was received. The email message is then transmitted to the appropriate email addresses (step 1216), e.g., as indicated by other parameters or by email addresses that are stored within a file.

If the associated publication mechanism indicates instant message publication (step 1218), then an instant message is generated that includes the privacy codes as text within the instant message along with other information if necessary (step 1220). The instant message is then transmitted to the appropriate recipients (step 1222), e.g., as indicated by other parameters or by IM identifiers that are stored within a file.

In any case, after the privacy codes for the privacy level have been processed, then a determination is made as to whether there are any additional and unprocessed privacy levels (step 1224). If so, then the process loops back to step 1202 to process another privacy level; if not, then the process is concluded.

If multiple publication mechanisms are indicated for a particular privacy level, then the privacy codes would be published via all indicated publication mechanisms. If the privacy code publication server is publishing privacy codes for more than one user, and each user has a privacy code distribution policy, then the process that is shown in FIG. 12 would be repeated for each user.

In this example, it is assumed that privacy codes are pushed to the indicated destinations. However, the privacy codes could be pulled by entities that can prove that they are located at the indicated destinations.

The advantages of the present invention should be apparent in view of the detailed description that is provided above. Even with existing controls in typical prior art instant messaging applications, there are many annoyances associated with these systems, especially when the user deals with a wide and dynamic community of users, and the annoyances are not limited to spam. It has become increasingly common for users to turn off their instant messaging applications for substantial parts of the day or to indicate an "invisible" status that does not allow other users to see that they are online. For example, in a corporate context, salespersons and consultants can be bombarded by instant messages immediately after starting an instant messaging application.

The present invention is directed to an instant messaging system that employs privacy codes to minimize the number of bothersome instant messages that could potentially be received by a recipient. In this manner, the utilization of privacy codes acts as a type of authorization mechanism for allowing instant messaging access to a recipient. The recipient can choose to employ multiple privacy codes to represent multiple privacy levels. The user may then operate in a fully open mode in which received messages are always delivered, or the user may activate the privacy functionality such that senders must provide a privacy code in order to have immediate delivery of an instant message. At each privacy level, different delivery actions might be performed. For example, a user who cannot provide a privacy code might have all of the user's messages rejected by the recipient system. For other users who provide a first valid privacy code, the delivery operation might immediately present a received message as in a typical instant messaging system, but other users who provide a different valid privacy code might have their messages shunted to a instant message queue in which the queued messages are reviewed or delivered at the convenience of the recipient. Other delivery parameters may include different presentation styles for displaying an instant message or alerting the user to the presence of unreviewed instant messages or instant messages to which the user has not yet responded.

It is not always appropriate to only permit a specific group of individuals to access a recipient via an instant messaging system; there is often a legitimate need for a sender who does not know the recipient to contact the recipient through an instant messaging communication medium. However, allowing full access to all potential senders can result in annoying interruptions that disrupt a user's daily activities.

The present invention addresses these needs through the use of privacy codes. These privacy codes are loosely controlled; in other words, strict authorization schemes are not employed to ensure that only a predetermined set of users have legitimate possession of the privacy codes. While the present invention requires that a sender has a valid privacy code before the sender's instant messages are accepted by a recipient system for additional processing in some manner, the privacy codes are not securely distributed. A person who knows a recipient's privacy code can share the privacy code with potential senders if that person feels there is a valid need to contact the recipient.

In this manner, the privacy codes of the present invention can be slowly distributed amongst an increasing number of people. At some subsequent point in time, though, the privacy codes are reset, thereby resetting the number of people who have knowledge of a valid privacy code. This scenario is analogous in some ways to a cipher lock on a door to a loosely controlled area. Initially, the passcode for the cipher lock is distributed to a limited group of individuals, but over a period of time, knowledge of the passcode spreads to other individuals, usually on some loosely defined requirements of a need-to-know basis. At some point in time, though, the passcode is changed and then redistributed to a limited group of individuals, which may or may not be the same as the initial group of individuals.

For example, in a corporate context, a set of employees might be brought together to work on a short-term project. Some of these employees may know each other well while other employees may be relatively unknown. Using the present invention, these employees may share their privacy codes along with other employees' privacy codes in order to facilitate rapid communication during the project. After the project is completed, though, the employees may no longer have a legitimate need to have full access to each other through an instant messaging communication medium; after a period of time, the privacy codes would be altered, and the employees would need to rely upon other communication mediums, like email or telephonic communications, to reach each other.

Another corporate example might involve a secretary that attempts to buffer access to a corporate executive or to protect the valuable time of the corporate executive. Using the present invention, the secretary has the ability to decide which individuals have high levels of privacy access to the executive through an instant messaging system. Since the privacy codes can be altered when desired, the decision to provide high level privacy access to any particular individual does not necessarily have a long-term consequence.

Another advantage of the present invention is that sender authentication is not required to facilitate policy-based control over message delivery. Even if someone were to impersonate a user to send a message, without the appropriate privacy code, the sender would not be able to bypass policy considerations. This approach could be very useful in cases where there are users who need to be visibly online but need to be shielded from bogus messages, e.g., high-level executives who may be prime targets for impersonated message traffic.

The present invention also provides for a publication mechanism. When using privacy codes in an instant messaging system, it is desirable to have a way of publishing codes to the appropriate audience. A strict correspondence is not required between those to whom a published privacy code is directly distributed and those who have knowledge of the code as anyone in possession of a privacy code may legitimately distribute it further. This aspect of privacy codes does, however, make it desirable to invalidate and reissue them occasionally to reset the knowledge of the code to a known group of people. The publication of the privacy codes may be controlled with reference to some form of policy. A privacy code distribution component distributes privacy codes automatically or upon demand based upon various configurable parameters.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method of communication comprising:
receiving a request message to establish an instant messaging connection between a recipient system and a sender system; and
obtaining a privacy code from the sender system before establishing the requested instant messaging connection, wherein the privacy code is associated with a single user;
wherein obtaining the privacy code from the sender system before establishing the requested instant message system comprises:
sending, from the recipient system to the sender system prior to delivery of a first instant message, a second instant message that requests the privacy code;
receiving, a third instant message at the recipient system from the sender system;
scanning the third instant message; and
establishing the instant messaging connection if the third instant message contains a valid privacy code.

2. The method of claim 1 further comprising:
determining validity of the privacy code with reference to a privacy policy, wherein determining validity of the privacy code is performed by a policy engine.

3. The method of claim 2 wherein a delivery option is selected from a group comprising:
forwarding the third instant message to an email address;
placing the third instant message in a message queue; or
immediately presenting the third instant message on a display at the recipient system.

4. The method of claim 1 further comprising:
processing the third instant message that is received through the instant message connection in accordance with privacy parameters associated with the privacy code.

5. The method of claim 1 further comprising:
determining a delivery option associated with the privacy code.

6. An apparatus for communicating comprising:
means for receiving a request message to establish an instant messaging connection between a recipient system and a sender system; and means for obtaining a privacy code from the sender system before establishing the requested instant messaging connection, wherein the privacy code is associated with a single user;
wherein the means for obtaining the privacy code from the sender system before establishing the requested instant message system comprises:
means for sending, from the recipient system to the sender system prior to delivery of a first instant message, a second instant message that requests the privacy code;
means for receiving, a third instant message at the recipient system from the sender system;
scanning the third instant message; and
means for establishing the instant messaging connection if the third instant message contains a valid privacy code.

7. The apparatus of claim 6 further comprising:
means for determining validity of the privacy code with reference to a privacy policy, wherein determining validity of the privacy code is performed by a policy engine.

8. The apparatus of claim 7 wherein a delivery option is selected from a group comprising:
means for forwarding the third instant message to an email address;
means for placing the third instant message in a message queue; or
means for immediately presenting the third instant message on a display at the recipient system.

9. The apparatus of claim 6 further comprising:
means for processing the third instant message that is received through the instant message connection in accordance with privacy parameters associated with the privacy code.

10. The apparatus of claim 6 further comprising:
means for determining a delivery option associated with the privacy code.

11. A computer program product in a non-transitory computer readable medium for use in a data processing system for communicating, the computer program product comprising:
means for receiving a request message to establish an instant messaging connection between a recipient system and a sender system; and
means for obtaining a privacy code from the sender system before establishing the requested instant messaging connection, wherein the privacy code is associated with a single user;
wherein the means for obtaining the privacy code from the sender system before establishing the requested instant message system comprises:
means for sending, from the recipient system to the sender system prior to delivery of a first instant message, a second instant message that requests the privacy code;
means for receiving, a third instant message at the recipient system from the sender system;
scanning the third instant message; and
means for establishing the instant messaging connection if the third instant message contains a valid privacy code.

12. The computer program product of claim 11 further comprising:
means for determining validity of the privacy code with reference to a privacy policy, wherein determining validity of the privacy code is performed by a policy engine.

13. The computer program product of claim 11 further comprising:
means for processing the third instant message that is received through the instant message connection in accordance with privacy parameters associated with the privacy code.

14. The computer program product of claim 11 further comprising:
means for determining a delivery option associated with the privacy code.

15. The computer program product of claim 14 wherein a delivery option is selected from a group comprising:
means for forwarding the third instant message to an email address;
means for placing the third instant message in a message queue; or
means for immediately presenting the third instant message on a display at the recipient system.

16. A method of communication comprising:
receiving a first instant message at a recipient system from a sender system;
obtaining a privacy code from the sender system before performing further processing on the first instant message, wherein the privacy code is associated with a single user;
sending, from the recipient system to the sender system prior to delivery of the first instant message, a second instant message that requests the privacy code;
receiving a third instant message at the recipient system from the sender system;
scanning the third instant message; and
accepting the first instant message if the third instant message contains a valid privacy code.

17. The method of claim 16 further comprising:
determining validity of the privacy code from the third instant message with reference to a privacy policy, wherein determining validity of the privacy code is performed by a policy engine.

18. The method of claim 16 further comprising:
processing the first instant message in accordance with privacy parameters associated with the valid privacy code.

19. The method of claim 18 further comprising:
retrieving the privacy parameters from a privacy policy.

20. The method of claim 18 further comprising:
determining a delivery option associated with the valid privacy code.

21. The method of claim 20 wherein a delivery option is selected from a group comprising:
blocking the first instant message from delivery;
returning from the recipient system to the sender system a fourth instant message that indicates an online status of a user of the recipient system;
forwarding the first instant message to an email address;
placing the first instant message in an instant message queue; or
immediately presenting the first instant message on a display at the recipient system.

22. The method of claim 16 further comprising:
   determining if privacy functionality is active prior to sending the second instant message that requests a privacy code; and
   immediately presenting the first instant message in response to a determination that privacy functionality is not active.
23. The method of claim 22 further comprising:
   activating privacy functionality in accordance with temporal parameters.
24. The method of claim 16 further comprising:
   determining if a valid privacy code has been previously received at the recipient system from the sender system within a current instant messaging session prior to sending the second instant message that requests a privacy code; and
   immediately presenting the first instant message in response to a determination that a valid privacy code has been previously received.
25. An apparatus for communicating comprising:
   means for receiving a first instant message at a recipient system from a sender system; and
   means for obtaining a privacy code from the sender system before performing further processing on the first instant message, wherein the privacy code is associated with a single user;
   means for sending, from the recipient system to the sender system prior to delivery of the first instant message, a second instant message that requests a privacy code;
   means for receiving a third instant message at the recipient system from the sender system;
   means for scanning the third instant message; and
   means for accepting the first instant message if the third instant message contains a valid privacy code.
26. The apparatus of claim 25 further comprising:
   means for determining validity of the privacy code from the third instant message with reference to a privacy policy, wherein determining validity of the privacy code is performed by a policy engine.
27. The apparatus of claim 25 further comprising:
   means for processing the first instant message in accordance with privacy parameters associated with the valid privacy code.
28. The apparatus of claim 27 further comprising:
   means for retrieving the privacy parameters from a privacy policy.
29. The apparatus of claim 27 further comprising:
   means for determining a delivery option associated with the valid privacy code.
30. The apparatus of claim 29 wherein means for a delivery option is selected from a group comprising:
   means for blocking the first instant message from delivery;
   means for returning from the recipient system to the sender system a fourth instant message that indicates an online status of a user of the recipient system;
   means for forwarding the first instant message to an email address;
   means for placing the first instant message in an instant message queue; or
   means for immediately presenting the first instant message on a display at the recipient system.
31. The apparatus of claim 25 further comprising:
   means for determining if privacy functionality is active prior to sending the second instant message that requests a privacy code; and
   means for immediately presenting the first instant message in response to a determination that privacy functionality is not active.
32. The apparatus of claim 31 further comprising:
   means for activating privacy functionality in accordance with temporal parameters.
33. The apparatus of claim 25 further comprising:
   means for determining if a valid privacy code has been previously received at the recipient system from the sender system within a current instant messaging session prior to sending the second instant message that requests a privacy code; and
   means for immediately presenting the first instant message in response to a determination that a valid privacy code has been previously received.
34. A computer program product in a non-transitory computer readable medium for use in a data processing system for communicating, the computer program product comprising:
   means for receiving a first instant message at a recipient system from a sender system;
   means for obtaining a privacy code from the sender system before performing further processing on the first instant message, wherein the privacy code is associated with a single user;
   means for sending, from the recipient system to the sender system prior to delivery of the first instant message, a second instant message that requests the privacy code
   means for receiving a third instant message at the recipient system from the sender system;
   means for scanning the third instant message; and
   means for accepting the first instant message if the third instant message contains a valid privacy code.
35. The computer program product of claim 34 further comprising:
   means for determining validity of the privacy code from the third instant message with reference to a privacy policy, wherein determining validity of the privacy code is performed by a policy engine.
36. The computer program product of claim 34 further comprising:
   means for processing the first instant message in accordance with privacy parameters associated with the valid privacy code.
37. The computer program product of claim 36 further comprising:
   means for retrieving the privacy parameters from a privacy policy.
38. The computer program product of claim 36 further comprising:
   means for determining a delivery option associated with the valid privacy code.
39. The computer program product of claim 38 wherein means for a delivery option is selected from a group comprising:
   means for blocking the first instant message from delivery;
   means for returning from the recipient system to the sender system a fourth instant message that indicates an online status of a user of the recipient system;
   means for forwarding the first instant message to an email address;
   means for placing the first instant message in an instant message queue; or
   means for immediately presenting the first instant message on a display at the recipient system.

40. The computer program product of claim 34 further comprising:
  means for determining if privacy functionality is active prior to sending the second instant message that requests a privacy code; and
  means for immediately presenting the first instant message in response to a determination that privacy functionality is not active.

41. The computer program product of claim 40 further comprising:
  means for activating privacy functionality in accordance with temporal parameters.

42. The computer program product of claim 34 further comprising:
  means for determining if a valid privacy code has been previously received at the recipient system from the sender system within a current instant messaging session prior to sending the second instant message that requests a privacy code; and
  means for immediately presenting the first instant message in response to a determination that a valid privacy code has been previously received.

* * * * *